United States Patent [19]
Dickson et al.

[11] Patent Number: 5,699,154
[45] Date of Patent: Dec. 16, 1997

[54] METHOD AND APPARATUS FOR INSTALLING PIPES

[75] Inventors: Dudley Trevor Dickson, Whitley Bay; Mohammed Yunis Aziz, Newcastle upon Tyne, both of United Kingdom

[73] Assignee: British Gas plc, London, England

[21] Appl. No.: 605,436

[22] Filed: Feb. 22, 1996

[30] Foreign Application Priority Data

Feb. 23, 1995 [GB] United Kingdom ............... 9503678
Jun. 12, 1995 [GB] United Kingdom ............... 9511910

[51] Int. Cl.⁶ .................................................. G01N 21/00
[52] U.S. Cl. ............................ 356/241; 356/240; 356/244
[58] Field of Search ................................... 356/241, 240, 356/244

[56] References Cited

U.S. PATENT DOCUMENTS

| | | | |
|---|---|---|---|
| 3,909,139 | 9/1975 | Wood | 356/241 |
| 4,317,632 | 3/1982 | Orphan et al. | |
| 4,722,001 | 1/1988 | Rohrich et al. | |
| 5,313,936 | 5/1994 | Miyazaki et al. | 356/241 |
| 5,362,962 | 11/1994 | Barborak et al. | |

FOREIGN PATENT DOCUMENTS

| | | |
|---|---|---|
| 2 102 565 | 2/1983 | United Kingdom . |
| 2 249 370 | 5/1992 | United Kingdom . |
| 2 275 981 | 9/1994 | United Kingdom . |

*Primary Examiner*—Frank G. Font
*Assistant Examiner*—Reginald A. Ratliff
*Attorney, Agent, or Firm*—Larson and Taylor

[57] ABSTRACT

Sensor apparatus 18 for use in a plastic service pipe 16 inside a steel service pipe 10 connected to a main consists of a flexible element 42 which is fed through the steel pipe 10 and through the plastic pipe 16. The element 42 has at its remote end two light-emitting diodes 80 and two photoconductive cells 82 The flexible element 42 and the pipe 16 are fed together into the steel pipe 10. The sensor apparatus 18 indicates when the cells 82 have entered the main 14 because the intensity of the light reflected to the cells 82 falls to a low value and gives an audible or visual signal. This also indicates that the end of the plastic pipe 16 which carries a seal 38 is positioned correctly and that sealant 30 can be injected into the space between the steel pipe 10 and the plastic pipe 16 and is detected by a second light sensor arrangement 154/156. After the sealant 30 has been injected the sensor apparatus 18 can be recovered by withdrawal through the nose-piece 32 and through the pipe 10.

13 Claims, 5 Drawing Sheets

METHOD AND APPARATUS FOR INSTALLING PIPES

FIELD OF THE INVENTION

The invention relates to an apparatus and method for use in installing pipes typically within existing pipes.

The invention is applicable, for example, to the installation of gas feeder pipes, in particular to the installation of a plastic service pipe within an existing steel service pipe. The steel pipe is connected to a buried main at one end and is connected to a gas meter within a dwelling at the other end. In order to install the plastic service pipe, the meter is removed so that one end of the steel pipe is accessible within the dwelling. Then the plastic pipe is fed through the steel pipe (through the accessible end) towards the main. Once the plastic pipe has been inserted a fluid sealant may be injected into the space between the steel pipe and the plastic pipe.

The present invention is concerned with an apparatus and method which provides a mechanism for accurately defining when such an inserted pipe is located in the correct position and/or receipt of the fluid sealant

SUMMARY OF THE INVENTION

According to the invention there is provided a method for use in installing a plastic pipe in an existing steel pipe connected to a main, the method comprising inserting a flexible element through an open end of the steel pipe remote from the main, said element incorporating a housing which carries at least one electric source of light and at least one electric means sensitive to light, said at least one source and said at least one means being connected to an electric circuit, including a supply of energy for said sources, which circuit includes a warning device and which circuit energises said device if the intensity of light reaching said means is reduced.

According to the invention there is provided an elongate probe for insertion in a pipe to determine its continuing location in the pipe and comprising at least one light emitting device for providing a light source radiating externally of the probe and light detector means to detect reflected light from the pipe wall, and means for automatically providing an indication of a drop in reflected light indicative of the probe reaching the end of the pipe.

Further according to the invention there is provided an elongate flexible probe for insertion in a pipe and a first light emitting detector system comprising at lease one light emitting device for providing a light source radiating externally of the probe and light detector means to detect reflected light from the pipe wall, and means for automatically providing an indication of a drop in reflected light indicative of the probe reaching the end of the pipe, and a second light emitting detector system spaced from the first system for determining when sealing fluid passing through the pipe is adjacent the pipe end.

Still further according to the invention there is provided an elongate flexible probe for insertion into a pipe and comprising at least one light source radiating externally of the probe and light detector means to detect reflected light from the pipe wall to determine the relative position of the probe within the pipe and/or to determine the presence of sealer in the vicinity of the light sensor.

Thus, for example, if the sensor apparatus is fed into a steel pipe it will give an indication when the sensor reaches the main. If the sensor apparatus is fed into the steel pipe along with a plastic pipe, the sensor protruding from the remote end of the plastic pipe, the indication will also indicate that the remote end of the plastic pipe is correctly positioned adjacent to the main.

In one embodiment, the sensor apparatus can give an indication when the fluid sealant has filled the space between the steel pipe and the plastic pipe.

DESCRIPTION OF THE PREFERRED EMBODIMENT

Embodiments of methods for use in installing pipes and of apparatus for use in carrying out such methods will now be described by way of example with reference to the accompanying drawings, in which.

Figure 1:
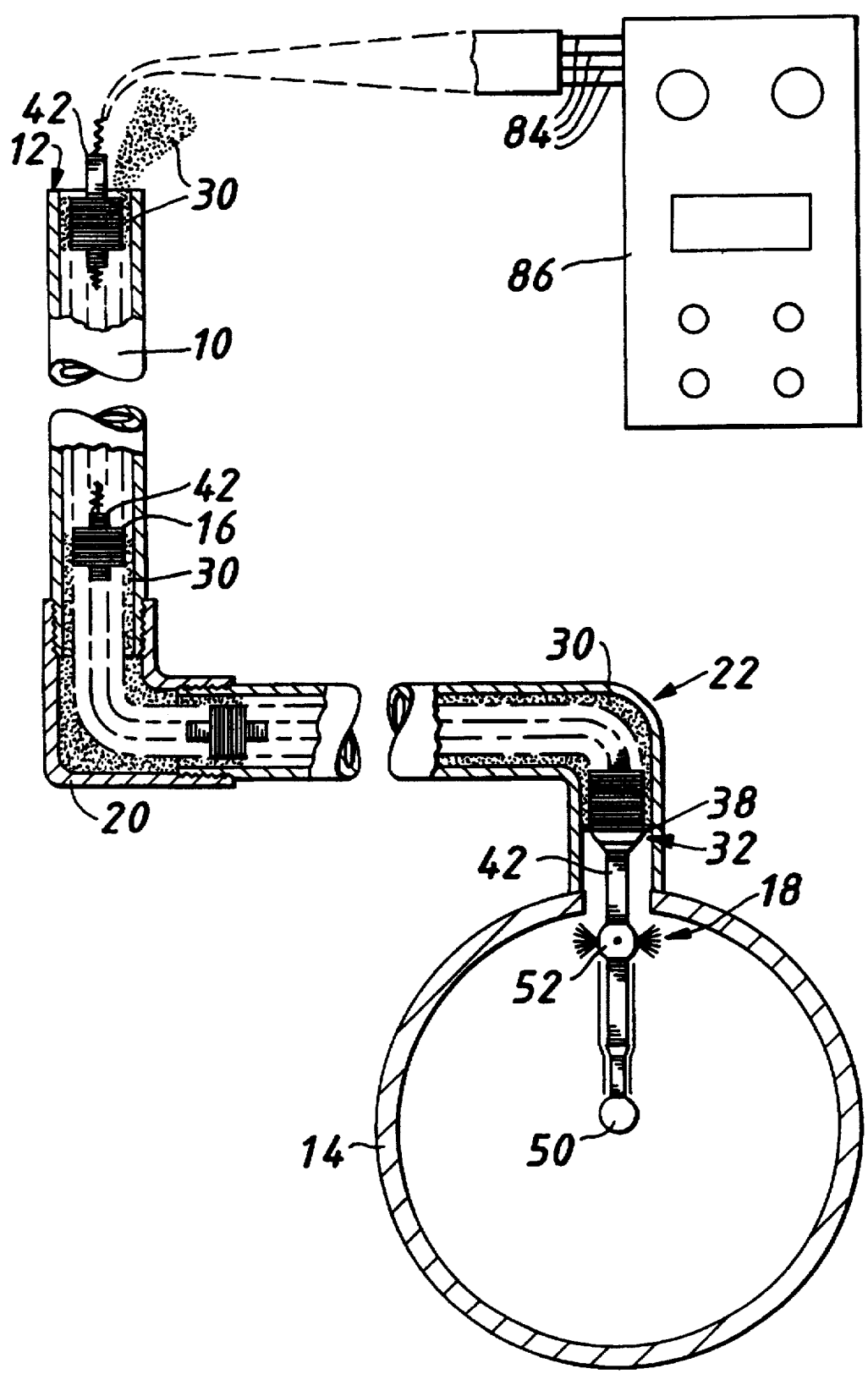
FIG. 1 is a vertical section through part of a steel service pipe and a buried main showing a plastic service pipe inserted through the steel service pipe and showing a first embodiment of sensor apparatus.

FIG. 1 shows a steel service pipe 10 which has an accessible upper end 12 and a lower end connected to a buried gas main 14. The lower end would, in most cases, be connected to a service tee (not shown) which in turn is connected to the main 14. The accessible end 12 is normally connected to a gas meter (not shown) which has been removed. It will be appreciated that the accessible end 12 has apparatus (not shown) connected to it which enables the insertion of a plastic service pipe 16 and a sensor assembly 18 without loss of gas (the main 14 is a live main and is full of gas at the pressure used by the distribution system, e.g. 75 millibars).

As shown, the plastic (e.g. polyethylene) service pipe 16 has been inserted through the accessible end 12 and fed through the steel service pipe 10. The sharp bends presented by the elbow 20 and the portion 22 have been successfully negotiated by the plastic service pipe 16 which has an internal liner 24 (see FIG. 2) also made of polyethylene.

Only portions of the service pipe 16 are shown in FIG. 1 for the sake of clarity but of course this is a continuous pipe.

The plastic service pipe 16 having been inserted in the steel service pipe 10 far enough, the space between the steel pipe 10 and the plastic pipe 16 is filled with a fluid sealant 30, which is injected through the apparatus (not shown) and effectively through the accessible end 12.

When the fluid sealant 30 has been injected, the sensor assembly 18 is withdrawn through the nose-piece 32. The nose-piece 32 comprises an outer annular part 34 and an inner part 36 (see FIG. 2). The inner part 36 is a temporary part of the nose-piece 32 and is secured to the flexible guide element 42 (described below) forming part of the sensor probe. The nose-piece carries an outer, annular seal 38 which engages the inner wall of the steel service pipe 10.

The nose-piece 32 prevents the sealant 30 from passing into the main 14 beyond the remote end of the plastic pipe 16.

The flexible guide and sensor assembly extend through the accessible end 12 of the steel service pipe 10, through the plastic pipe 16 and through the nose-piece 32. The plastic pipe 16 and the guide assembly are fed through the steel pipe 10 together. The flexible guide assembly assists in achieving negotiation of the sharp bends at 20 and 22 in the steel pipe 10. The protruding end portion of the flexible guide assembly, beyond the nose-piece 32, also acts to guide the plastic pipe 16 during its advance through the steel pipe 10. The flexible assembly includes a housing 50 and a sensor housing 52.

After the sealant 30 has been injected, the flexible guide assembly 18 is withdrawn, together with the inner part 36 which is secured to the assembly 18. The housing 52 passes through the outer annular part 34 which is left behind in the steel pipe 10. Also, the plastic pipe 16 is now connected to the main 14 through the outer annular part 34.

Figure 2:
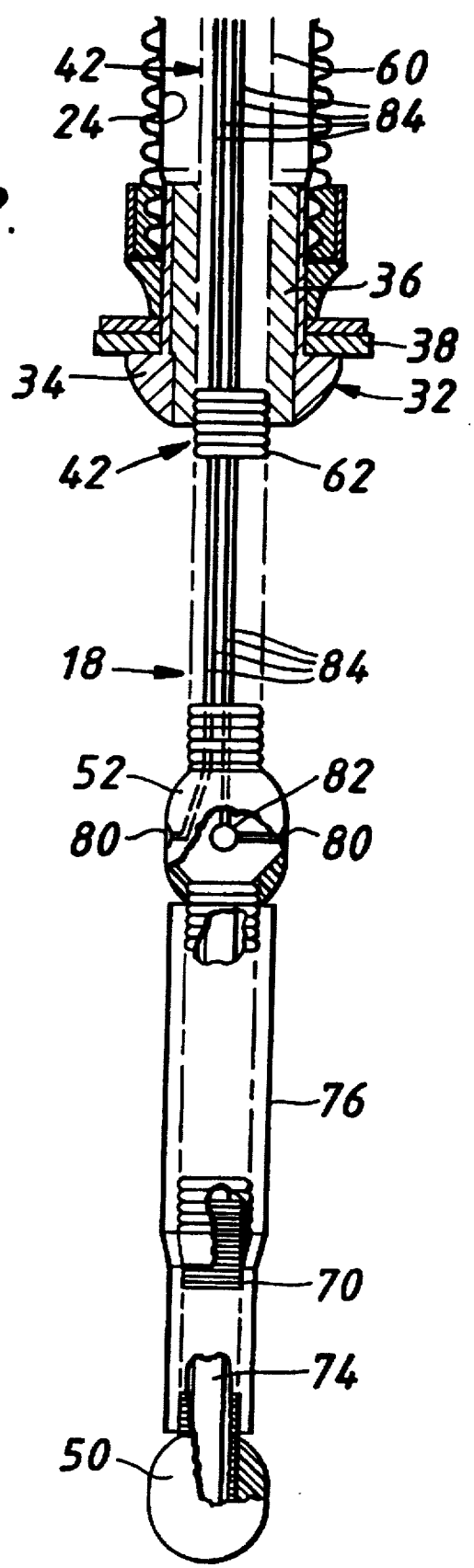
FIG. 2 is a vertical section through part of the plastic service pipe and apparatus shown in FIG. 1.

The preferred form of construction, however, is shown in FIG. 2. Here, the flexible assembly is connected to the inner part 36. The upper part 60 is connected to a first plug part (not shown) and the lower part 62 (the part protruding beyond the nose-piece 32) is connected to a second plug part (not shown). The plug parts are removably engaged and both are incorporated within the inner part 36 of the nose-piece 32. When it is desired to replace the part 62 the two plug parts are readily disconnected and a new part 62 is connected in place of the first. This is done, of course, while the flexible assembly is separated from the plastic pipe 16 and from the nose-piece 32. The plug parts are connected to electrical leads 84 (described below) which are shown for simplicity as being continuous within the inner part 36. In fact, the plug parts include male and female connectors to which the leads 84 are connected.

With this preferred form of construction (FIG. 2) withdrawal of the flexible guide assembly immediately displaces the inner part 36 from the outer annular part 34 of the nose-piece 32 and allows the housing 52 to pass upwardly through the outer part 34. Again, the plastic pipe 16 is connected to the main 14 through the outer annular part 34.

Below the housing 52, the flexible guide assembly includes a coiled wire spring 70 lying partly within the turns of the flexible guide element 42. The element 42 terminates in a frusto-conical ferrule. The assembly also includes a length of rubber 74 lying within the spring 70. The whole of the assembly between the bead 50 and the housing 52 is encased in a braided plastic sheath 76.

The sensor 18 (FIG. 2) comprises the flexible guide element 42; two sources of light, e.g. light-emitting diodes (LEDs) 80 located in the housing 52; two means sensitive to light e.g. photoconductive cells 82, only one of which is shown in FIG. 2 located in the housing 52; electrical leads 84 connecting the LEDs 80 and the cells 82 (located at or adjacent the lower end of the flexible guide element 42) to a combined power supply and signal processor 86 (FIG. 1) located at or adjacent the other, upper end of the flexible guide element 42. The processor 86 includes an electric circuit (FIG. 3 which includes a supply of electrical energy for the LEDs 80 and which responds to a change in intensity of light reaching the cells 82.

The sensor 18, while the LEDs 80 and the cells 82 are inside the steel pipe 10, does not give any alarm indication. That is because the intensity of light reflected from the inner wall of the steel pipe 10 and sensed by the cells 82 is sufficient to keep the associated circuit in the non-alarm state. When the LEDs 80 and the cells 82 enter the main the intensity of the reflected light sensed by the cells 82 falls to a very low value. The change is detected by the circuit shown in FIG. 3 and an alarm or other indication is given.

The LEDs 80 and the cells 82 are positioned in a common plane extending transversely of the length of the elongate guide element. The LEDs 80 are spaced apart 180° as are the cells 82, but are spaced 90° from each adjacent cell 82.

Figure 3:
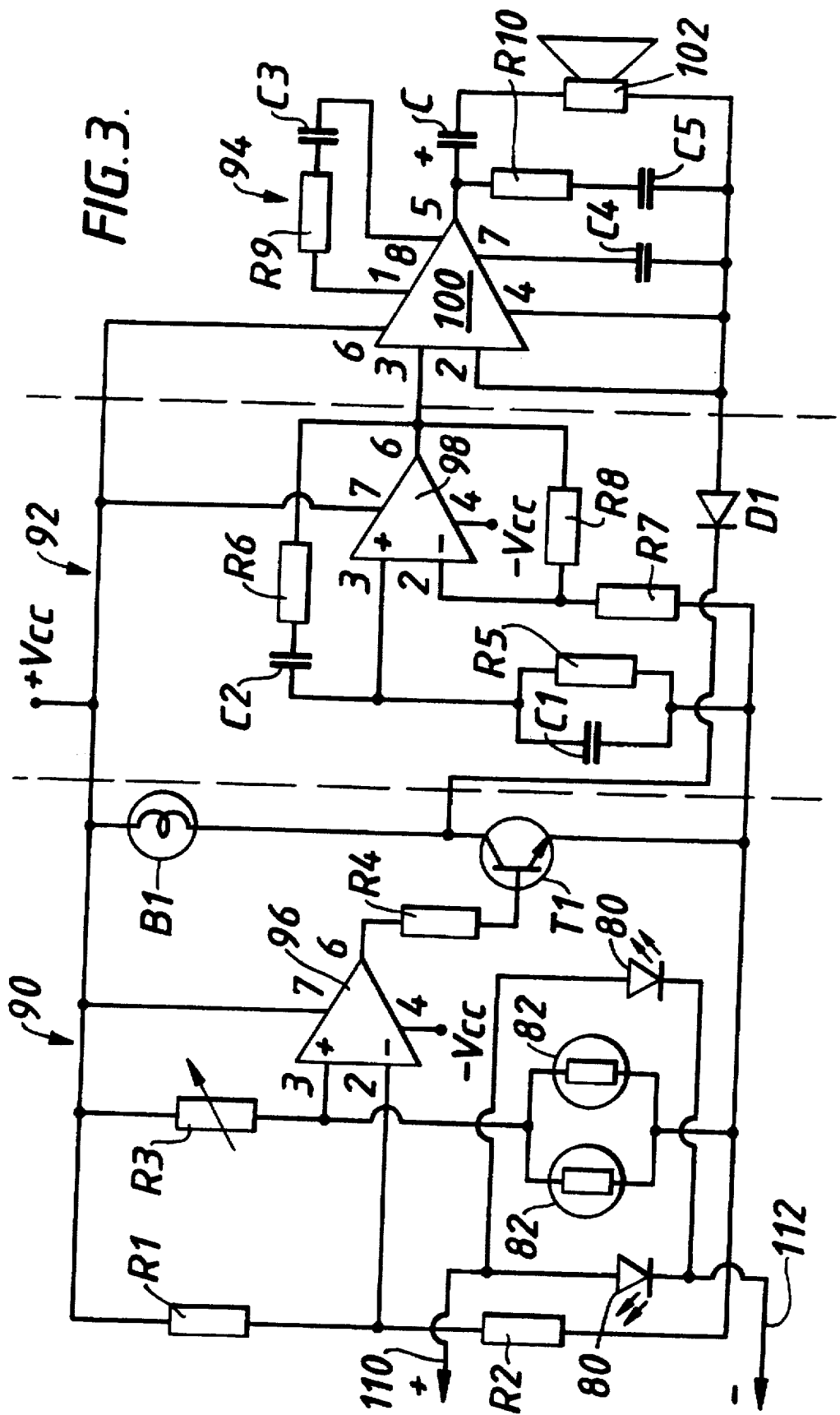
FIG. 3 is a circuit diagram of part of the apparatus shown in FIGS. 1 and 2.

The circuit shown in FIG. 3 consists of three main stages, they are the sensor stage 90, the signal generator stage 92, and the audio power amplifier stage 94. The circuit includes two batteries (not shown) as a power source.

In the first stage 90 the voltage at the inverting input of the op-amp 96 is fixed by the potential divider formed by resistors R1 and R2 selected to make sure that a sufficient voltage drop is maintained at the inverting input of the op-amp 96 while the non-inverting input is connected to the junction of the photoconductive cells 82 (connected in parallel) and a potentiometer R3.

The potentiometer R3 is used to set the threshold for the cells 82 and to trigger the circuit at the desired level of light intensity. The op-amp 96 is operating as a simple comparator to drive the transistor T1 ON or OFF depending on the light intensity picked by the cells 82. Resistor R4 is used to limit the current supplied to the base of the transistor T1.

Next is the signal generator stage 92 where the components resistors R5, R6 and capacitors C1 and C2 are used to determine the frequency of the audio signal, as follows:

$$f=1/2\pi\sqrt{C_1 C_2 C_5 C_6}$$

which reduces to:

$$f=1/2\pi RC$$

when $R=R5=R6$ and $C=C1=C2$.

The resistors R7 and R8 are used to set the gain for the circuit of the op-amp 98 which is:

$$Av=(R8+R7)/R7$$

The gain (Av) must be at least a ratio of 3 in order to maintain the required audio signal.

In the audio amplifier stage 94 (e.g. LM386N) is a low voltage power amplifier. C4 is a bypass capacitor, and the combination of resistor R9 and capacitor C3 between pins 1 and 8 is chosen to adjust the gain of the amplifier 100 between 20to 200. The components C5, C6 and R10 at the output of the audio amplifier 100 are used to provide the fixed voltage required to the loudspeaker 102.

The LEDs 80 are connected in parallel to a driving circuit (not shown) by the leads 110, 112.

A bulb B1 is connected in series with the collector of the transistor T1. The bulb B1 is illuminated when the transistor conducts.

Figure 4:
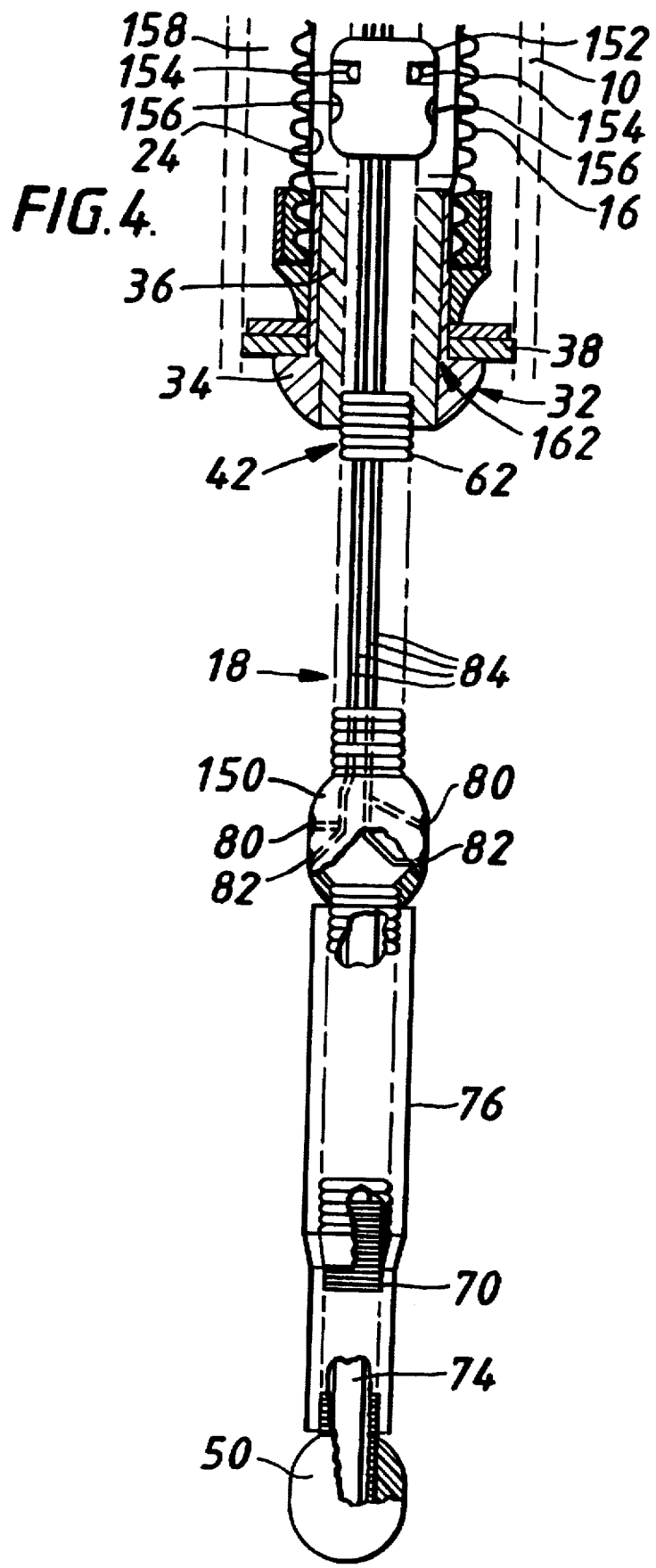
FIG. 4 is a vertical section corresponding to FIG. 1 but showing a second form of sensor apparatus.
Figure 5:
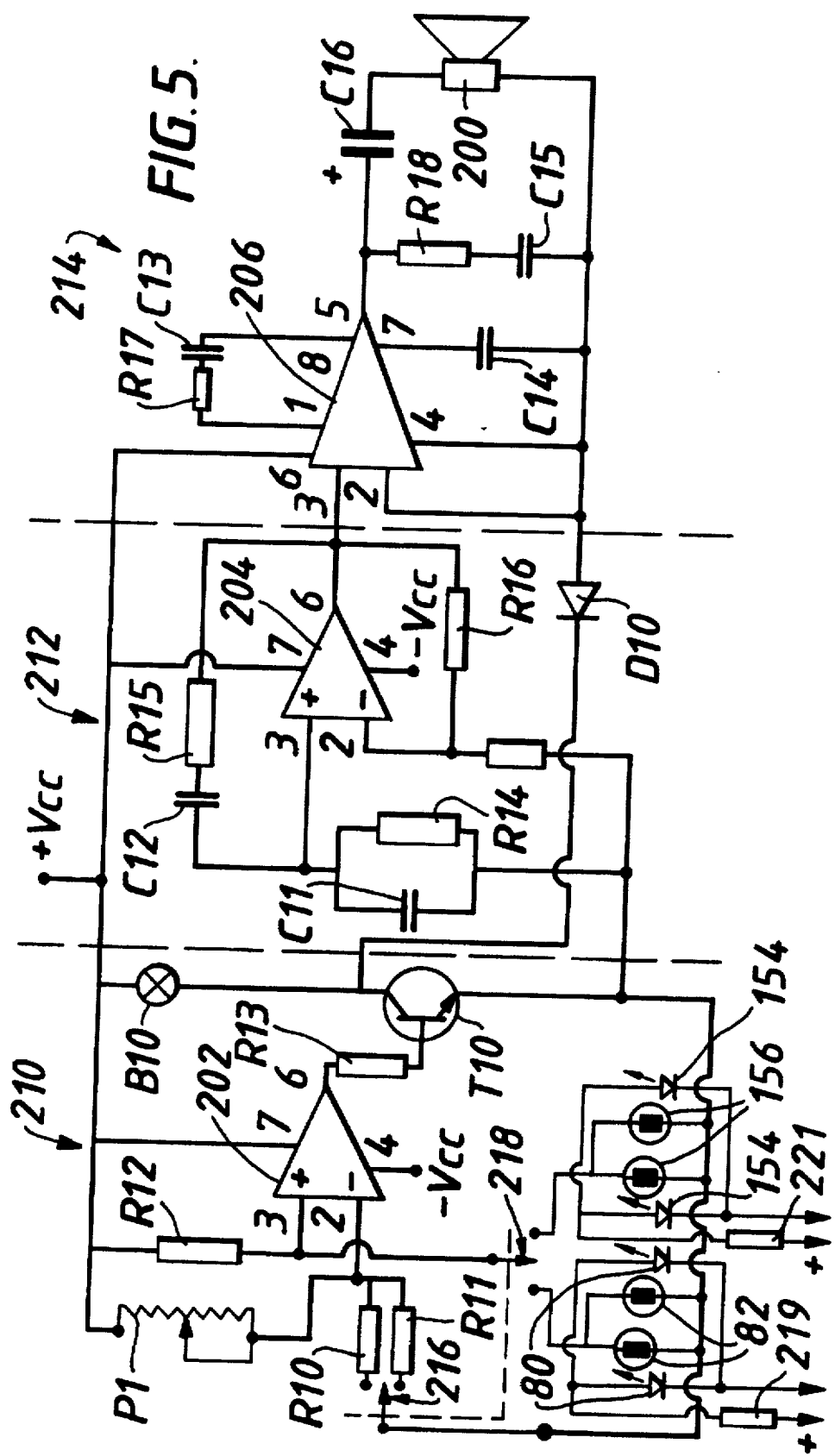
FIG. 5 is a circuit diagram of part of the apparatus shown in FIG. 4.

A second embodiment of a method for use in installing a plastic pipe, and of apparatus for performing it, is shown in FIGS. 4 & 5.

In this embodiment there are two sensor housings corresponding to the housing 52 used in the embodiment described with reference to FIGS. 1 to 3. The first housing 150 has the same function as the housing 52 described with reference to FIGS. 1 to 3 although in this embodiment the LED and photosensor of each pair are in a common plane. The remainder of the sensor is constructed as before with the exception of the second housing 152. The same reference numerals are used in FIG. 4 for the same features as described with reference to FIG. 2.

The housing 152 carries two light-emitting diodes (LEDs) 154 and two photoconducive cells 156. An LED and a cell are arranged in a common plane on one side of the housing 152. The other LED and the other cell are arranged in the same plane on the other side of the housing 152. Light emitted from the LEDs 154 is reflected from the inner surface of the plastic pipe 16 and also from the inner surface of the steel pipe 10. The intensity of the reflected light is sufficient to keep the loudspeaker in the un-energised condition. However, as explained below, when fluid sealant is injected into the space 158 and fully occupies the annular space around the housing 152 no light is reflected from the inner surface of the steel pipe 10.

The circuit (described with reference to FIG. 5) is tuned so that it responds to the reduced light intensity reaching the cells 156. As a result a loudspeaker (corresponding to the loudspeaker 102) is energised.

Leads (not shown in FIG. 4) corresponding to the leads 84 described with reference to FIGS. 1 to 3 connected the LEDs 154 and the cells 156 to the electric circuit to be described below.

In both the embodiment shown in FIG. 2 and the embodiment shown in FIG. 4, the guide assembly 18 is in two parts which are joined end to end by two connectors (not shown) together making up the part 36. Once the two parts have been connected the part 36 behaves exactly as a unitary member during the installation of the plastic pipe 16 inside the steel pipe 10. However, should it become necessary to replace the leading end of the assembly 18 the two connectors can be readily disconnected, the leading end replaced and the connectors reconnected.

The part 36 is, in effect, secured to the flexible guide element 42. The part 36, as shown in FIGS. 1, 2 and 4, engages a step 162 formed in the bore of the nose-piece.

Thus, there are mutually engaging stop means on the part 36 and on the flexible guide element 42 which ensure that as the guide element 42 is advanced through the steel pipe 10, the plastic pipe 16 (which is secured to the nose-piece) is also advanced.

When the sealant 30 has been injected, the stop means described above are free to disengage to allow the flexible element 42 and the part 36 to be withdrawn through the nose-piece 32, leaving the latter behind in the steel pipe 10.

FIG. 5 shows the electric circuit which is used in the sensor apparatus shown in FIG. 4.

The circuit shown in FIG. 5 is very similar to that shown in FIG. 3 and consists of the same stages, a sensor stage 210, a signal generator 212 and an audio power amplifier stage 214.

However, the sensor stage 210 differs in having two ganged switches 216,218. In the first position of the switches 216, 218 the circuit is conditioned to respond to the light intensity falling on the cells 82. In the second position, the circuit is conditioned to respond to the light intensity falling on the cells 156. Thus, the switches 216, 218 are moved to the first position when it is desired to know when the housing 150 has emerged into the main 14. The switches 216, 218 are moved to the second position when it is desired to know when fluid sealant in the space between the steel pipe 10 and the plastic pipe 16 has reached the annular space surrounding the housing 152.

The LEDs 80 and the cells 82 and the LEDs 154 and the cells 156 are connected via resistors 219, 221 to driver circuits (not shown) and the values of the resistors 219, 221 depend on the driver circuit chosen.

The sensor apparatus is tuned regarding its operation for each housing 150, 152 each time the sensor apparatus is used for the installation of a plastic pipe.

The sequence used is as follows:

1. The electronics are switched on and a battery and alarm signal check is performed by pressing the button (not shown) on the box containing the electronics. This energises the horn 200 providing the battery is delivering its potential difference;

2. A check is performed on both sets of LEDs by switching the switches 216, 218 between the first and second positions;

3. The flexible guide element 42 and the nose-piece 32 with the plastic pipe 16 are inserted in the open end of the steel pipe 10 via the service head adapter (not shown);

4. The switches 216, 218 are moved to the first position (with the switch 216 in its uppermost position as seen in FIG. 5);

5. The tuner potentiometer P1 is adjusted until the alarm is not audible and the bulb B10 is not illuminated. The potentiometer P1 is then adjusted further by turning the potentiometer knob to decrease its resistance a further full turn to keep the horn silent. The circuit is now adjusted so that the audible indication is just imminent;

6. The flexible guide element 42 and the plastic pipe 16 are now inserted further into the steel pipe 10 until the audible indication is activated. This indicates that the bead 150 has entered the main 14. Insertion of the flexible element 42 is immediately halted;

7. The electronics are now switched off and the switches 216, 218 are moved to their second position;

8. The electronics are now switched on again and the potentiometer P1 is again tuned until the light from bulb B10 is just extinguished and the horn 200 is silent.

9. Fluid sealant is now injected into the space 158 between the steel pipe 10 and the plastic pipe 16 between the apparatus (not shown) at the open end of the pipe 10 and the nose-piece 32 using a feeder pump (not shown) until the audible indication is given by the horn 200 and the light is emitted by the bulb B10. The electronics are then switched off and the feeder pump is stopped and the sealant pressure is released. Sealant has now reached the annular space surrounding the housing 152;

10. A short period is allowed for the sealant to gel—say, two minutes for example. Then the flexible element is retracted and the meter re-assembled on the steel pipe 10.

In a modification (not shown) instead of using the form of pipe 16 referred to above, another form of pipe may be used; for example, a corrugated pipe without the lining 24 or a plain, cylindrical pipe.

The method according to the invention has been described above for determining when a plastic pipe has been inserted through an existing service pipe or alternatively for determining when a plastic pipe has been inserted through an existing steel service pipe and determining when sealant has been injected. The method has other applications. For example, it can be used to obtain a measure of the length (up to a main) of an existing service pipe. In that case, only the flexible element would be used (i.e. no plastic pipe would be present) and an indication would be given when the flexible element had been inserted through the existing pipe and the housing 52 had entered the main.

The method can also be used, for example, to obtain an indication of when sealant has been injected around an inserted plastic pipe without the need to obtain any indication of whether the inserted pipe has been inserted far enough. In that case, a flexible assembly would be used having only one housing corresponding to the housing 152 described above. There would be no requirement for the housing corresponding to the housing 52 or 150.

What is claimed is:

1. A method for use in installing a plastic pipe in an existing steel pipe connected to a main, the method comprising inserting a flexible element through an open end of the steel pipe remote from the main, said element incorporating a housing which carries at least one electric source of light and at least one electric means sensitive to light, said at least one source and said at least one means being connected to an electric circuit, including a supply of energy for said sources, which circuit includes a warning device and which circuit automatically energises said device when the housing enters the main irrespective of the length of the steel pipe as the intensity of light reaching said means is reduced.

2. A method according to claim 1 in which the intensity of light is reduced by the step of advancing said flexible element until said housing enters said main.

3. A method for use in installing a plastic pipe in an existing steel pipe connected to a main, the method comprising inserting a flexible element through an open end of the steel pipe remote from the main, said element incorporating a housing which carries at least one electric source of light and at least one electric means sensitive to light, said at least one source and said at least one means being connected to an electric circuit, including a supply of energy for said sources, which circuit includes a warning device and which circuit energises said device if the intensity of light reaching said means is reduced, and reducing the intensity of light by injecting fluid sealant into the space between said steel pipe and said plastic pipe until said sealant occupies said space surrounding said housing.

4. A method for use in installing a plastic pipe in an existing steel pipe connected to a main, the method comprising inserting a flexible element through an open end of the steel pipe remote from the main, said element incorporating a housing which carries at least one electric source of light and at least one electric means sensitive to light, said at least one source and said at least one means being connected to an electric circuit, including a supply of energy for said sources, which circuit includes a warning device and which circuit energises said device if the intensity of light reaching said means is reduced, wherein said plastic pipe and said flexible element are inserted through said open end together wherein disappearance of the inner surface of said steel pipe is effected by inserting the flexible element until the housing enters the main, and wherein said plastic pipe carries at its leading end an assembly which includes an external seal which engages said steel pipe via an annular member which is secured to said flexible element and which engages stop means on said assembly or on said annular member, said stop means allowing advance of said flexible element into said steel pipe only together with said plastic pipe, but which allows withdrawal of said flexible element while leaving said plastic pipe behind anchored to said steel pipe by said sealant, the distance between said housing and said seal being such that when said housing enters said main, said seal is sufficiently advanced in said steel pipe.

5. A method for use in installing a plastic pipe in an existing steel pipe connected to a main, the method comprising inserting a flexible element through an open end of the steel pipe remote from the main, said element incorporating a housing which carries at least one electric source of light and at least one electric means sensitive to light, said at least one source and said at least one means being connected to an electric circuit, including a supply of energy for said sources, which circuit includes a warning device and which circuit energises said device if the intensity of light reaching said means is reduced, said electric circuit having a threshold of response and having means for adjusting said threshold of response of the circuit, and the method including the step of adjusting said threshold adjusting means before each occasion of inserting said flexible element.

6. A method according to claim 3, wherein said flexible element incorporates two of said housings, a first of said two housings being closer to the leading end of the flexible element and being used first to obtain said warning of when the first housing enters said main, and the second of said two housings being positioned at a greater distance from said leading end than said first housing, said second housing being used to obtain said warning of when the sealant has filled the space surrounding said second housing.

7. An elongate probe for insertion in a pipe to determine its continuing location in the pipe and comprising at least one light emitting device for providing a light source radiating externally of the probe and light detector means to detect reflected light from the pipe wall, and means for automatically indicating when the probe reaches the end of the pipe irrespective of the pipe length by utilising information from the light detector means.

8. A probe as claimed in claim 7 including flexible guidance means to allow the probe to move past bends and other hindrances in the pipe.

9. An elongate probe for insertion in a pipe to determine its continuing location in the pipe and comprising at least one light emitting device for providing a light source radiating externally of the probe and light detector means to detect reflected light from the pipe wall, means for automatically providing an indication of a drop in reflected light indicative of the probe reaching the end of the pipe, flexible guidance means to allow the probe to move past bends and other hindrances in the pipe, and a second light emitting detector system for determining when sealing fluid passing through the pipe is in the vicinity of the pipe end.

10. A probe as claimed in claim 7 wherein coupling means are provided to allow a flexible liner pipe to accompany the probe through the existing pipe.

11. A probe as claimed in claim 9 wherein means are provided to allow withdrawal of the probe whilst the linear pipe remains in situ.

12. An elongate flexible probe for insertion in a pipe a first light emitting detector system comprising at least one radiating externally of the probe and light detector means to detect reflected light from the pipe wall, and means for automatically providing an indication of a drop in reflected light indicative of the probe reaching the end of the pipe and a second light emitting detector system spaced from the first system for determining when sealing fluid passing through the pipe is adjacent the pipe end.

13. An elongate flexible probe for insertion into a pipe and comprising at least one light source radiating externally of the probe, light detector means to detect reflected light from the pipe wall to determine the relative position of the probe within the pipe and/or to determine the presence of sealer in the vicinity of the light sensor, and means connected to said light detector means for automatically indicating when the end of the pipe is reached and/or when sealant is present.

* * * * *